United States Patent
Hayes

(10) Patent No.: US 6,835,801 B2
(45) Date of Patent: Dec. 28, 2004

(54) ACTIVATED STARTER MIXTURES AND THE PROCESSES RELATED THERETO

(75) Inventor: John E. Hayes, Downintown, PA (US)

(73) Assignee: Bayer Antwerp, N.V., Antwerp (BE)

(*) Notice: Subject to any disclaimer, the term of this patent is extended or adjusted under 35 U.S.C. 154(b) by 200 days.

(21) Appl. No.: 10/199,916

(22) Filed: Jul. 19, 2002

(65) Prior Publication Data

US 2004/0014908 A1 Jan. 22, 2004

(51) Int. Cl.$^7$ .............................................. C08G 65/10
(52) U.S. Cl. ..................... 528/403; 528/408; 528/414; 528/415; 502/175
(58) Field of Search ................. 502/175; 528/403, 528/408, 414, 415

(56) References Cited

U.S. PATENT DOCUMENTS

| | | | |
|---|---|---|---|
| 3,278,457 A | 10/1966 | Milgrom | 260/2 |
| 3,278,459 A | 10/1966 | Herold | 260/2 |
| 3,427,256 A | 2/1969 | Milgrom | 252/431 |
| 3,829,505 A | 8/1974 | Herold | 260/611 B |
| 3,941,849 A | 3/1976 | Herold | 260/607 A |
| 4,472,560 A | 9/1984 | Kuyper et al. | 526/120 |
| 4,477,589 A | 10/1984 | van der Hulst et al. | 502/169 |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,545,601 A | 8/1996 | Le-Khac | 502/156 |
| 5,563,221 A | 10/1996 | Pazos | 525/409 |
| 5,639,705 A | 6/1997 | Bowman et al. | 502/175 |
| 5,689,012 A | 11/1997 | Pazos et al. | 568/619 |
| 5,767,323 A * | 6/1998 | Televantos et al. | 568/613 |
| 5,777,177 A | 7/1998 | Pazos | 568/679 |
| 5,844,070 A | 12/1998 | Hayes et al. | 528/501 |
| 5,919,988 A | 7/1999 | Pazos et al. | 568/679 |
| 6,077,978 A * | 6/2000 | McDaniel et al. | 568/620 |
| 6,359,101 B1 | 3/2002 | O'Connor et al. | 528/66 |

FOREIGN PATENT DOCUMENTS

| | | |
|---|---|---|
| JP | H5-17569 | 1/1993 |
| JP | H5-25267 | 2/1993 |
| WO | 01/04183 | 1/2001 |
| WO | 03/000770 | 1/2003 |

OTHER PUBLICATIONS

Database WPI Section Ch, Week 199215 Derwent Publications Ltd., London, GB; Class A25, AN 1992–118403 XP002261314 & JP 04 059825 A (Asahi Glass Co Ltd) Feb. 26, 1992 * abstract *.

* cited by examiner

Primary Examiner—Margaret G. Moore
Assistant Examiner—Marc S. Zimmer
(74) Attorney, Agent, or Firm—Joseph C. Gil; John E. Mrozinski, Jr.

(57) ABSTRACT

The present invention is directed to an activated starter mixture which can be used to prepare polyoxyalkylene polyols. The present invention is also directed to a process for preparing an activated starter mixture, particularly, to a process for preparing an activated starter mixture which is composed of a low molecular weight starter compound. The present invention is also directed to a batch or semi-batch process for the polyaddition of an alkylene oxide on to an activated starter mixture, particularly, on to an activated starter mixture which is composed of a low molecular weight starter compound.

The present invention provides an activated starter mixture, particularly, an activated starter mixture which is composed of a low molecular weight starter compound, which rapidly initiates polymerization. The present invention can eliminate the need to synthesize costly high molecular weight starter compounds by KOH catalysis in a separate, dedicated reactor.

22 Claims, No Drawings

ACTIVATED STARTER MIXTURES AND THE PROCESSES RELATED THERETO

TECHNICAL FIELD OF THE INVENTION

The present invention is directed to an activated starter mixture which can be used to prepare polyoxyalkylene polyols. The present invention is also directed to a process for preparing an activated starter mixture, particularly, to a process for preparing an activated starter mixture which is composed of a low molecular weight starter compound. The present invention is also directed to a batch or semi-batch process for the polyaddition of an alkylene oxide on to an activated starter mixture, particularly, on to an activated starter mixture which is composed of a low molecular weight starter compound.

BACKGROUND OF THE INVENTION

Base-catalyzed oxyalkylation processes have been used to prepare polyoxyalkylene polyols for many years. In base-catalyzed oxyalkylation processes, suitable low molecular weight starter compounds, such as propylene glycol or glycerine, are oxyalkylated with alkylene oxides, for example, ethylene oxide or propylene oxide, to form polyoxyalkylene polyols. Reactor capacity is effectively utilized in base-catalyzed oxyalkylation processes due to the fact that the build ratio (polyol weight/starter weight) is relatively high as a result of using low molecular weight starter compounds in the process.

However, to a varying degree, basic catalysts catalyze an isomerization of propylene oxide to form allyl alcohol. Allyl alcohol acts as a monofunctional initiator during the polymerization of propylene oxide. Thus, when a basic catalyst, such as potassium hydroxide, is used to catalyze a propylene oxide polymerization, the product contains allyl alcohol-initiated, monofunctional impurities. As the molecular weight of the product being polymerized increases, the isomerization reaction becomes more prevalent. As a result, 800 or higher equivalent weight poly(propylene oxide) products prepared using KOH as the catalyst tend to have significant quantities of monofunctional impurities. This tends to reduce the average functionality and broaden the molecular weight distribution of the product. Generally, polyols having higher average functionalities typically produce polyurethane products with better physical properties.

Double-metal cyanide ("DMC") catalysts can be used to produce polyols which have low unsaturation levels and more narrow molecular weight distributions compared with polyols produced using KOH catalysis. DMC catalysts can be used to produce polyether, polyester and polyetherester polyols which are useful in polyurethane coatings, elastomers, sealants, foams and adhesives.

DMC catalysts are typically obtained by reacting an aqueous solution of a metal salt (for example, zinc chloride) with an aqueous solution of a metal cyanide salt (for example, potassium hexacyanocobaltate), in the presence of an organic complexing ligand. The preparation of a typical DMC catalyst is described in, for example, U.S. Pat. Nos. 3,427,256, 3,289,505 and 5,158,922.

Organic complexing ligands are needed in the preparation of DMC catalysts in order to obtain favorable catalytic activity. While water-soluble ethers (e.g., dimethoxyethane ("glyme") or diglyme) and alcohols (for example, isopropyl alcohol or tert-butyl alcohol) are commonly used as the organic complexing ligand, other general classes of compounds have been described which are useful as the organic complexing ligand. For example, U.S. Pat. Nos. 4,477,589, 3,829,505 and 3,278,459 disclose DMC catalysts containing organic complexing ligands selected from alcohols, aldehydes, ketones, ethers, esters, amides, nitriles and sulphides.

DMC catalysts having increased activity for epoxide polymerization are known. For example, U.S. Pat. Nos. 5,482,908 and 5,545,601 disclose DMC catalysts having increased activity which are composed of a functionalized polymer such as polyether.

In the presence of DMC catalysts, however, conventional low molecular weight starter compounds (such as water, propylene glycol, glycerine and trimethylolpropane) initiate oxyalkylation sluggishly (if at all), particularly in a typical batch process for the preparation of polyols. Long catalyst initiation times increase reaction cycle time and can lead to deactivation of the DMC catalyst. As a result, in a typical batch or semi-batch process, starter compounds having a high molecular weight are typically used.

High molecular weight starter compounds which are used in DMC-catalyzed alkoxylation processes are typically prepared by alkoxylating low molecular weight starter compounds, such as glycerine, in the presence of a basic catalyst, such as KOH, to produce alkoxylated polyol starters of several hundred molecular weight. Such starter compounds are refined to remove KOH residues and then alkoxylated in the presence of DMC catalysts to produce polyether polyols of several thousand molecular weight. The base catalyst must be removed from the starter compound before the starter compound can be used as an initiator in a DMC-catalyzed oxyalkylation process because even traces of basic substances often de-activate DMC catalysts.

A process for preparing polyether polyols using DMC catalysis which eliminates the need to synthesize costly high molecular weight starter compounds by KOH catalysis in a separate, dedicated reactor is described in, for example, U.S. Pat. No. 6,359,101. However, the process described in this patent is limited to activating specific low molecular weight starter compounds in the presence of DMC catalysts under specific reaction conditions.

Another process for preparing polyether polyols using DMC catalysis which eliminates the need to synthesize costly high molecular weight starter compounds by KOH catalysis is described in, for example, U.S. Pat. No. 5,767,323. This patent describes using pre-initiated initiator/alkylene oxide/catalyst master batches which have decreased induction periods. This patent discloses adding one or more initiators having an equivalent weight of from 100 Da to 500 Da and catalyst to a reactor and, after $N_2$ flushing, adding an initial quantity of alkylene oxide until a pressure drop occurs. Preferably, alkylene oxide is added to the activated starter mixture but, optionally, the activated starter mixture can be mixed further with additional starter compound, specifically, a starter compound of the same or of a high molecular weight. Oxyalkylation can then be commenced without an appreciable induction period.

In typical batch or semi-batch processes for producing DMC-catalyzed polyols, high molecular weight starter compounds and DMC catalysts are charged to a reactor all at once. One drawback of charging starter compounds to a reactor all at one time is inefficient use of reactor capacity. For example, the preparation of a 3000 Da molecular weight polyoxypropylated glycerine triol may be achieved through oxypropylation of a 1500 Da molecular weight oligomeric oxypropylated glycerine starter until a molecular weight of 3000 Da is achieved. The build ratio is 3000 Da/1500 Da or 2.0. This low build ratio cannot efficiently take advantage of reactor capacity, as some 40% of the total reactor capacity is used just for the starter compound.

U.S. Pat. No. 5,689,012 describes a process for producing DMC-catalyzed polyols which makes effective use of reactor capacity while at the same time effectively using low molecular weight starter compounds. The process described in this patent, however, is directed to continuously adding low molecular weight starter compounds to a reactor rather than charging high molecular weight starter compounds to a reactor all at one time (such as in a batch or semi-batch process).

U.S. Pat. No. 5,777,177 also describes a process for producing DMC-catalyzed polyols which makes effective use of reactor capacity while at the same time effectively using low molecular weight starter compounds. The process disclosed in U.S. Pat. No. 5,777,177 describes producing DMC-catalyzed polyols by continuously feeding propylene oxide and low molecular weight starter compounds (such as, for example, water, propylene glycol, glycerine or trimethylol propane) to a reactor along with an additional feed of propylene oxide and catalyst after polymerization has been initiated with a high molecular weight starter compound.

The process described in U.S. Pat. No. 5,777,177, however, requires that a low concentration of a low molecular weight starter compound always be maintained in the reactor so that the low molecular weight starter compound is consumed at the same rate at which it is added to the reactor. There therefore remains a need for an improved batch or semi-batch process for the polyaddition of an alkylene oxide on to a starter compound, particularly, on to a low molecular weight starter compound.

SUMMARY OF THE INVENTION

The present invention is directed to an activated starter mixture which can be used to prepare polyoxyalkylene polyols. The present invention is also directed to a process for preparing an activated starter mixture, particularly, to a process for preparing an activated starter mixture which is composed of a low molecular weight starter compound. The present invention is also directed to batch or semi-batch process for the polyaddition of an alkylene oxide on to an activated starter mixture, particularly, on to an activated starter mixture which is composed of a low molecular weight starter compound.

DESCRIPTION OF THE INVENTION

The present invention is directed to an activated starter mixture which is composed of a) at least one pre-activated starter compound which is composed of i) at least one of a first starter compound having an equivalent weight which is at least 70; ii) at least one epoxide; and iii) at least one DMC catalyst (hereinafter referred to as "master batch"); and b) at least 2 mole % of at least one of a second starter compound having an equivalent weight which is less than the equivalent weight of the first starter compound.

The present invention is also directed to a process for preparing an activated starter mixture which involves mixing a) at least one master batch; with b) at least 2 mole % of at least one of a second starter compound having an equivalent weight which is less than the equivalent weight of the first starter compound.

The present invention is also directed to a batch or semi-batch process for the polyaddition of an alkylene oxide on to an activated starter mixture which involves reacting 1.) at least one activated starter mixture which is composed of a mixture of at least one master batch and at least 2 mole % of at least one of a second starter compound having an equivalent weight which is less than the equivalent weight of the first starter compound; with 2.) at least one epoxide.

Any hydroxyfuntional starter known in the art which has an equivalent weight of at least 70 can be used as the first starter compound. First starter compounds of the present invention have equivalent weights of at least 70, preferably, at least 150, more preferably, at least 250 and average hydroxyl functionalities within the range of from about 1 to about 8.

First starter compounds of the present invention can be prepared by any process known in the art, for example, by base catalysis or by DMC-catalysis. DMC-catalyzed first starter compounds useful in the present invention are those which are prepared, for example, by reacting a heterocyclic monomer (usually an epoxide) with an active hydrogen-containing initiator (typically a low molecular weight polyol) in the presence of a DMC catalyst. See, for example, U.S. Pat. No. 5,689,012. Base-catalyzed first starter compounds useful in the present invention are those which are prepared, for example, by reacting a heterocyclic monomer (usually an epoxide) with an active hydrogen-containing initiator (typically a low molecular weight polyol) in the presence of KOH.

Examples of first starter compounds which can be used in the present invention include, for example, polyoxypropylene polyols, polyoxyethylene polyols, polytetatramethylene ether glycol, propoxylated glycerols, tripropylene glycol, alkoxylated allylic alcohols and mixtures thereof.

Any hydroxyfunctional starter known in the art which has an equivalent weight which is less than the equivalent weight of the first starter compound can be used as the second starter compound. The amount of second starter compound which can be mixed with the master batch is dependent on a number of factors including, for example, equivalent weight of the starter, catalyst level, activity of the catalyst, equivalent weight of the first starter compound used to prepare the master batch and other reaction conditions such as temperature, oxide type, oxide feed rate, as well as the desired hydroxyl number of the product. Generally, the higher the equivalent weight of the second starter compound, the higher the catalyst level and the higher the activity of the catalyst, the greater the amount of second starter compound which can be mixed with the master batch.

Examples of second starter compounds which can be used in the present invention include, for example, water, propylene glycol, dipropylene glycol, tripropylene glycol, neopentyl glycol, diethylene glycol, triethylene glycol, glycerine, trimethylol propane, sorbitol, methanol, ethanol, butanol, polyoxypropylene polyols, polyoxyethylene polyols, alkoxylated allylic alcohols and mixtures thereof. Preferred second starter compounds of the present invention include glycerine, propylene glycol, dipropylene glycol and tripropylene glycol.

Any epoxide known in the art can be used in the present invention. Examples of epoxides which can be used in the present invention include, for example, ethylene oxide, propylene oxide, butylene oxide, styrene oxide and mixtures thereof.

DMC catalysts which can be used in the present invention are known in the art and are described in, for example, U.S. Pat. Nos. 3,278,457, 3,829,505, 3,941,849, 4,472,560, 5,158,922, 5,470,813 and 5,482,908. Preferred DMC catalysts which are useful in the present invention are composed of zinc hexacyanocobaltate(III), tert-butanol and a functionalized polyol as disclosed in U.S. Pat. No. 5,482,908.

The process of the present invention is suitable for use with various forms of DMC catalysts, including, for example, powders, pastes (See, for example, U.S. Pat. No. 5,639,705) and suspensions (See, for example, U.S. Pat. No. 4,472,560).

Master batches of the present invention can be prepared by combining at least one of a first starter compound with at least one epoxide in the presence of at least one DMC catalyst. Preferably, the master batch of the present invention is prepared by reacting a first starter compound with an epoxide in the presence of a DMC catalyst at temperatures in the range of from about 60° C. to about 250° C., preferably, from about 80° C. to about 180° C., more preferably, from about 90° C. to about 140° C.

Enough epoxide is added to activate the DMC catalyst. DMC catalyst activation is usually indicated by a pressure drop in a reactor, typically, a drop in pressure within the range of from about 30 to about 50% from the initial pressure in the reactor. The initial pressure in the reactor is obtained by adding a desired amount of epoxide to the reactor. Typically, completion of DMC catalyst activation is indicated when the pressure in the reactor stops decreasing, thereby indicating that all of the epoxide has been consumed. The amount of DMC catalyst present in the master batch is in the range of from about 50–10,000 ppm, preferably, from about 50–5,000 ppm, based on the total amount of master batch.

Preferably, the first starter compound is stripped before it is reacted with the epoxide. The stripping step is typically performed with both the first starter compound and DMC catalyst present. Stripping is preferably performed under vacuum as disclosed in, for example, U.S. Pat. No. 5,844,070.

Preferred stripping methods include inert gas sparging combined with vacuum stripping, wiped-film evaporation, vacuum stripping in the presence of an organic solvent and the like. The temperature at which stripping is performed is not critical. Preferably, stripping is performed at a temperature within the range of from about 60° C. to about 200° C., more preferably, from about 80° C. to about 150° C. Stripping is performed at reduced pressure (less than 760 mm Hg). Preferably, stripping is performed at reactor pressures less than about 300 mm, more preferably, less than about 200 mm.

Reducing the water content of the first starter compound by stripping offers faster catalyst activation. Preferably, the water content of the first starter compound is reduced to less than about 100 ppm, more preferably, to less than about 50 ppm. The water content of the first starter compound can also be reduced by other methods known to those skilled in the art.

The master batch can be stored under appropriate storing conditions for a period of time and then mixed with a second starter compound or it can prepared and then, within a relatively short amount of time, mixed with a second starter compound. The master batch may be a "heel" from the master batch of a prior polyoxyalkylation process.

Preferably, the master batch is mixed within a relatively short period of time with at least 2 mole %, preferably, at least about 50 mole %, more preferably, at least about 75 mole %, based on the total mole % of the master batch, of a second starter compound. Typically, the master batch and second starter compound are mixed at temperatures in the range of from about 60° C. to about 250° C., preferably, from about 80° C. to about 180° C., more preferably, from about 90° C. to about 140° C.

The master batch of the present invention is mixed with a second starter compound to produce an activated starter mixture. Activated starter mixtures produced according to the present invention are particularly useful in batch or semi-batch processes for the preparation of polyoxyalkylene polyols. Preferably, the activated starter mixture of the present invention is stripped as mentioned above and then reacted with at least one epoxide to produce a polyoxyalkylene polyol. The activated starter mixture is typically reacted with epoxide at a temperature in the range of from about 20° C. to about 200° C., preferably, from about 40° C. to about 180° C., more preferably, from about 50° C. to about 150° C. The reaction can be carried out under an overall pressure of 0.0001 to 20 bar. The polyaddition can be carried out in bulk or an inert organic solvent, such as toluene and/or tetrahydrofuran ("THF"). The amount of solvent is usually 0 to 30 wt. %, based on the total weight of the polyoxyalkylene polyol to be prepared.

Polyoxyalkylene polyols prepared by the process of the present invention typically have number average molecular weights within the range of from 200 to 100,000 g/mol, preferably, from about 1,000 to 50,000 g/mol, more preferably, from about 2,000 to 20,000 g/mol.

Polyoxyalkylene polyols prepared by the process of the present invention are useful for producing polyurethane foams, elastomers, sealants, coatings and adhesives. Additionally, polyoxyalkylene polyols produced by the process of the present invention have lower unsaturation levels than polyoxyalkylene polyols produced using basic catalysts.

Typically, polyoxyalkylene polyols produced by the process of the present invention have unsaturation values less than 0.015 meq/g, preferably, less than 0.008 meq/g. Preferably, polyoxyalkylene polyols produced by the process of the present invention have unsaturation values of about 0.0015 meq/g. Typically, polyoxyalkylene polyols produced by the process of the present invention have hydroxyl number values within the range of from about 50 to about 500, preferably, from about 200 to about 400 and, more preferably, from about 200 to about 250 mg KOH/g.

The present invention provides several advantages. First, the present invention provides an activated starter mixture, particularly, an activated starter mixture which is composed of a low molecular weight starter compound, which rapidly initiates polymerization. (See Example 1) In contrast, a typical low molecular weight starter compound is sluggish to initiate, even in the presence of a highly-active DMC catalyst. (See Comparative Example 2)

Second, the present invention can eliminate the need to synthesize costly high molecular weight starter compounds by KOH catalysis in a separate, dedicated reactor because low molecular weight starter compounds can be activated by the master batch of the present invention. And third, because it is possible to employ low molecular weight starter compounds in the present invention, the polymerization build ratio of the present invention is relatively high. As a result, the process of the present invention effectively utilizes reactor capacity.

The Examples below also demonstrate that the process of the present invention produces polyols having improved physical properties. Propoxylation of a typical low molecular weight starter compound, as shown by Comparative Example 2, produces a polyether polyol having a dark purple color. In contrast, propoxylating the activated starter mixture prepared according to the present invention produces a polyether polyol with only a faint tinge of the color pink. Consumers prefer to purchase polyols which have a light color or no color at all. Additionally, propoxylating the activated starter mixture prepared according to the present invention produces a polyether polyol having a low viscosity, a narrow molecular weight distribution and a low unsaturation value.

EXAMPLE 1

Preparation of a polyether polyol by propoxylating an activated starter mixture prepared according to the present invention:

A one liter stirred autoclave was charged with polyoxypropylene diol (400 MW) starter (70 gms) and a DMC catalyst (0.1673 gms), prepared as set forth in U.S. Pat. No. 5,482,908, the teaching of which are incorporated herein by reference. The mixture was heated under vacuum with nitrogen stripping to 130° C. and held for 15 minutes. The reactor was blocked under vacuum and sufficient propylene oxide was added to raise the initial pressure to 20 psia (about 12 gms). Within about two minutes, DMC catalyst activation was noted by an accelerated pressure drop to less than 50% of the initial pressure. After about ten minutes, the pressure stopped decreasing, indicating all of the propylene oxide was consumed, thereby forming a master batch. The contents of the reactor were cooled to 70° C. The master batch was then reacted with dipropylene glycol (200 gms) to produce an activated starter mixture. The activated starter mixture was then heated under vacuum with nitrogen stripping to 100° C. and held for 15 minutes. The reactor was blocked under vacuum and heated to 130° C. and sufficient propylene oxide was added to raise the initial pressure to about 40 psia (about 39 gms). The pressure was monitored and, after about twenty minutes, an accelerated pressure drop to less than 50% of the initial pressure occurred. Propylene oxide (537 gms) was continuously added at a constant rate over about two hours. The reaction was then held at 130° C. until a constant pressure was observed. Residual un-reacted monomer was stripped from the product under vacuum at 60° C. The product had a faint pink color. The resulting polyol had a hydroxyl number of 264 meq/g, an unsaturation value of 0.0015 meq/g, a polydispersity of 1.03 and a viscosity of 87 cps.

EXAMPLE 2 (COMPARATIVE)

Direct Propoxylation of Dipropylene Glycol:

A one liter stirred autoclave was charged with dipropylene glycol (200 gms) and 0.149 gms of the DMC catalyst which was used in Example 1 (prepared as set forth in U.S. Pat. No. 5,482,908). The contents were heated under vacuum with nitrogen stripping to 100° C. and held for fifteen minutes. The reactor was blocked under vacuum, heated to 130° C. and sufficient propylene oxide was added to raise the initial pressure to 25 psia (about 19 gms). The reactor pressure was monitored and, after about thirty-five minutes, it fell to about 70% of its initial value. An additional 10 gms of propylene oxide was added. After thirty minutes the pressure had again dropped to about 70% of its initial value. An additional 19 gms of propylene oxide was added and allowed to react for thirty minutes. At this point, propylene oxide (386 gms) was added to the reactor at a rate sufficient to maintain a pressure of about 35 psia. It took 4.5 hrs to complete the oxide addition. The reaction was then held at 130° C. until a constant pressure was observed. Residual un-reacted monomer was stripped from the product under vacuum at 60° C. The product had a dark purple color. The resulting polyol had a hydroxyl number of 258 meq/g, an unsaturation value of 0.0010 meq/g, a polydispersity of 1.04 and a viscosity of 75 cps.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An activated starter mixture comprising the reaction product of:
   a) at least one pre-activated starter compound comprising the reaction product of:
      i) at least one of a first starter compound having an equivalent weight which is at least 70;
      ii) at least one epoxide; and
      iii) at least one DMC catalyst; and
   b) at least 2 mole % of at least one of a second starter compound having an equivalent weight which is less than the equivalent weight of the first starter compound.

2. The mixture of claim 1 in which the first starter compound has an equivalent weight greater than or equal to about 200.

3. The mixture of claim 1 in which the second starter compound has an equivalent weight less than or equal to about 80.

4. The mixture of claim 1 in which the first starter compound is a polyoxypropylene polyol, a polyoxyethylene polyol, polytetatramethylene ether glycol, propoxylated glycerol, tripropylene glycol, an alkoxylated allylic alcohol or a mixture thereof.

5. The mixture of claim 1 in which the second starter compound is water, propylene glycol, dipropylene glycol, tripropylene glycol, neopentyl glycol, diethylene glycol, triethylene glycol, glycerine, trimethylol propane, sorbitol, methanol, ethanol, butanol, a polyoxypropylene polyol, a polyoxyethylene polyol, an alkoxylated allylic alcohol or a mixture thereof.

6. The mixture of claim 1 in which the pre-activated starter compound is combined with at least 80 mole % of a second starter compound.

7. The mixture of claim 1 in which the double-metal cyanide catalyst is zinc hexacyanocobaltate.

8. A process for preparing an activated starter mixture comprising reacting:
   a) at least one pre-activated starter compound comprising the reaction product of:
      i) at least one of a first starter compound having an equivalent weight which is at least 70;
      ii) at least one epoxide; and
      iii) at least one DMC catalyst; with
   b) at least 2 mole % of at least one of a second starter compound having an equivalent weight which is less than the equivalent weight of the first starter compound.

9. The process of claim 8 in which the first starter compound has an equivalent weight greater than or equal to about 200.

10. The process of claim 8 in which the second starter compound has an equivalent weight less than or equal to about 80.

11. The process of claim 8 in which the first starter compound is a polyoxypropylene polyol, a polyoxyethylene polyol, polytetatramethylene ether glycol, propoxylated glycerol, tripropylene glycol, an alkoxylated allylic alcohol or a mixture thereof.

12. The process of claim 8 in which the second starter compound is water, propylene glycol, dipropylene glycol, tripropylene glycol, neopentyl glycol, diethylene glycol, triethylene glycol, glycerine, trimethylol propane, sorbitol, methanol, ethanol, butanol, a polyoxypropylene polyol, a polyoxyethylene polyol, an alkoxylated allylic alcohol or a mixture thereof.

13. The process of claim 8 in which the pre-activated starter compound is combined with at least 80 mole % of a second starter compound.

14. The process of claim 8 in which the double-metal cyanide catalyst is zinc hexacyanocobaltate.

15. A batch or semi-batch process for the polyaddition of an alkylene oxide on to an activated starter mixture comprising reacting:
  1.) at least one activated starter mixture comprising the reaction product of:
    a) at least one pre-activated starter compound comprising the reaction product of:
      i) at least one of a first starter compound having an equivalent weight which is at least 70;
      ii) at least one epoxide; and
      iii) at least one DMC catalyst; and
    b) at least 2 mole % of at least one of a second starter compound having an equivalent weight which is less than the equivalent weight of the first starter compound; with
  2.) at least one epoxide.

16. The process of claim 15 in which the first starter compound has an equivalent weight greater than or equal to about 200.

17. The process of claim 15 in which the second starter compound has an equivalent weight less than or equal to about 80.

18. The process of claim 15 in which the first starter compound is a polyoxypropylene polyol, a polyoxyethylene polyol, polytetatramethylene ether glycol, propoxylated glycerol, tripropylene glycol, an alkoxylated allylic alcohol or a mixture thereof.

19. The process of claim 15 in which the second starter compound is water, propylene glycol, dipropylene glycol, tripropylene glycol, neopentyl glycol, diethylene glycol, triethylene glycol, glycerine, trimethylol propane, sorbitol, methanol, ethanol, butanol, a polyoxypropylene polyol, a polyoxyethylene polyol, an alkoxylated allylic alcohol or a mixture thereof.

20. The process of claim 15 in which the pre-activated starter compound is combined with at least 80 mole % of a second starter compound.

21. The process of claim 15 in which the double-metal cyanide catalyst is zinc hexacyanocobaltate.

22. A polyether polyol prepared by the process of claim 15.

* * * * *